United States Patent
Aich et al.

(10) Patent No.: US 9,970,778 B2
(45) Date of Patent: May 15, 2018

(54) VEHICLE AND ELECTRIC BICYCLE CHARGE MONITORING INTERFACE

(71) Applicant: Ford Global Technologies, LLC, Dearborn, MI (US)

(72) Inventors: Sudipto Aich, Palo Alto, CA (US); David Melcher, Ypsilanti, MI (US); Zachary David Nelson, Detroit, MI (US); Christopher Peplin, Ann Arbor, MI (US); Jamel Seagraves, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/492,143

(22) Filed: Apr. 20, 2017

(65) Prior Publication Data

US 2017/0219366 A1     Aug. 3, 2017

Related U.S. Application Data

(62) Division of application No. 14/506,937, filed on Oct. 6, 2014, now Pat. No. 9,658,076.

(51) Int. Cl.
*G01C 21/34* (2006.01)
*B60L 11/18* (2006.01)
(Continued)

(52) U.S. Cl.
CPC ...... *G01C 21/3469* (2013.01); *B60L 11/1861* (2013.01); *B62J 99/00* (2013.01); *G01C 21/3415* (2013.01); *G01C 21/3676* (2013.01); *B60L 2200/12* (2013.01); *B60L 2240/62* (2013.01); *B62J 2099/002* (2013.01); *B62J 2099/004* (2013.01); *B62J 2099/0013* (2013.01)

(58) Field of Classification Search
CPC ............ B60L 11/1861; B60L 11/1862; G01C 21/3415; G01C 21/3423; G01C 21/3676; G01C 21/3469
See application file for complete search history.

(56) References Cited

U.S. PATENT DOCUMENTS

| 6,037,746 A | 3/2000 | Sheng et al. |
| 6,208,934 B1 | 3/2001 | Bechtolsheim et al. |

(Continued)

FOREIGN PATENT DOCUMENTS

| CN | 2825435 Y | 10/2006 |
| CN | 202016558 U | 10/2011 |

(Continued)

OTHER PUBLICATIONS

GB Search Report for Application No. GB1517552.4 dated Jan. 29, 2016.

*Primary Examiner* — Adam R Mott
(74) *Attorney, Agent, or Firm* — Jennifer Stec; Bejin Bieneman PLC

(57) ABSTRACT

A vehicle system includes a charging interface that is configured to connect to a bicycle battery and a processing device programmed to determine a state of charge of the bicycle battery. The processing device further estimates traveling ranges of a vehicle and a bicycle. The vehicle system further includes a navigation module programmed to generate a route to a selected destination based on the estimated traveling ranges of the vehicle and the bicycle.

9 Claims, 3 Drawing Sheets

(51) Int. Cl.
   *G01C 21/36*      (2006.01)
   *B62J 99/00*      (2009.01)

(56) References Cited

U.S. PATENT DOCUMENTS

| | | |
|---|---|---|
| 6,979,013 B2 | 12/2005 | Chen |
| 2007/0239348 A1 | 10/2007 | Cheung |
| 2009/0306888 A1 | 12/2009 | May et al. |
| 2013/0274951 A1* | 10/2013 | Gerhardt ............ G01C 21/3469 |
| | | 701/1 |
| 2014/0229046 A1 | 8/2014 | Gros et al. |
| 2015/0073636 A1 | 3/2015 | Machino |

FOREIGN PATENT DOCUMENTS

| | | |
|---|---|---|
| CN | 202309127 U | 7/2012 |
| CN | 202347886 U | 7/2012 |
| CN | 202978306 U | 6/2013 |
| CN | 203278289 U | 11/2013 |
| DE | 102014018111 | 6/2015 |
| EP | 2176117 B1 | 3/2011 |
| GB | 2501259 | 10/2013 |
| JP | 2012013481 | 1/2012 |
| WO | WO 2015022557 | 2/2015 |

* cited by examiner

VEHICLE AND ELECTRIC BICYCLE CHARGE MONITORING INTERFACE

CROSS-REFERENCE TO RELATED APPLICATION

This application is a divisional application of, and claims priority to, U.S. patent application Ser. No. 14/506,937, filed Oct. 6, 2014, titled "VEHICLE AND ELECTRIC BICYCLE CHARGE MONITORING INTERFACE", which is hereby incorporated herein by reference in its entirety.

BACKGROUND

The range of a battery-powered vehicle is limited by the state of charge of the battery. The operator of a battery-powered vehicle is responsible for monitoring the battery state of charge much the same way an operator of a gas-powered vehicle is responsible for monitoring a fuel tank level. Failing to monitor the battery state of charge could leave the battery-powered vehicle stranded or otherwise unable to reach its destination. To help the vehicle operator monitor the battery state of charge, battery-powered vehicles often present a measured or estimated battery state of charge to a vehicle operator.

DETAILED DESCRIPTION

Vehicle operators with access to different types of electric vehicles may be able to better navigate through crowded urban areas. For instance, when travelling to a destination in a congested area, an electric vehicle such as a battery-powered car or truck may be used to get the vehicle operator to an intermediate location on the outskirts of the congested area. From there, the vehicle operator can switch to another electric vehicle such as a battery-powered bicycle. The vehicle operator can use the battery-powered bicycle to go from the intermediate area to the destination.

The electric bicycle may be stowed in the electric vehicle, and the electric vehicle may charge the electric bicycle via a common charging interface. Moreover, the electric vehicle may include a system that has a processing device programmed to determine a state of charge of the vehicle battery and the bicycle battery. The processing device further estimates traveling ranges of a vehicle and a bicycle based on the states of charge. A navigation module may be programmed to generate a route to the destination based on the estimated traveling ranges of the vehicle and the bicycle.

With this system, the vehicle operator will know whether the electric vehicle has sufficient battery power to get to the intermediate location and whether the electric bicycle has sufficient battery power to go from the intermediate location to the destination and from the destination back to the intermediate location on a single charge. Moreover, the system can determine whether the vehicle battery will have sufficient charge for the electric vehicle to travel from the intermediate location to a charging location and whether the electric vehicle can charge the bicycle battery while travelling from the intermediate location to the charging location.

Alternatively, although discussed in the context of electric vehicles, the concept may be applied to other types of vehicles such as gas-powered or hybrid vehicles, including plug-in hybrid-electric vehicles. For gas or hybrid vehicles, the electric bicycle battery can be charged by a gas engine or other powertrain component in addition to or instead of by the vehicle battery. Charging the electric bicycle battery via the gas engine may increase the range of the electric bicycle.

The elements shown in the figures may take many different forms and include multiple and/or alternate components and facilities. The example components illustrated are not intended to be limiting. Indeed, additional or alternative components and/or implementations may be used.

Figure 1:
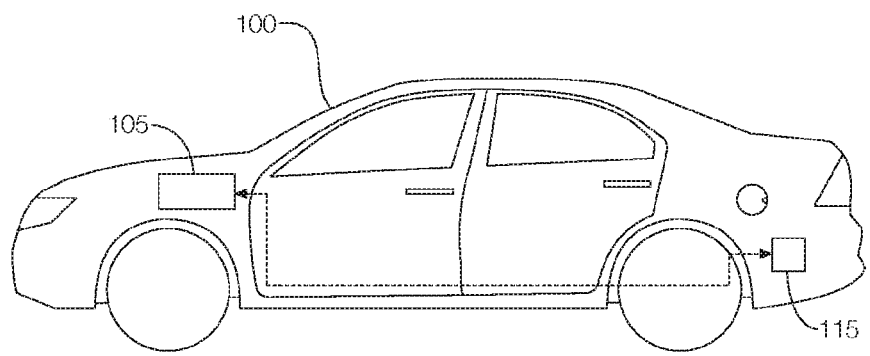
FIG. 1 illustrates an example vehicle that has a system that considers vehicle and bicycle battery states of charge when generating routes to a selected destination.
Figure 2:
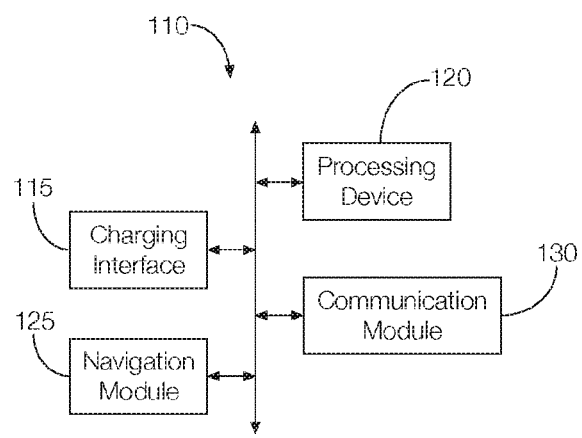
FIG. 2 is an example block diagram of the vehicle system that may be incorporated into the vehicle of FIG. 1.
Figure 3:
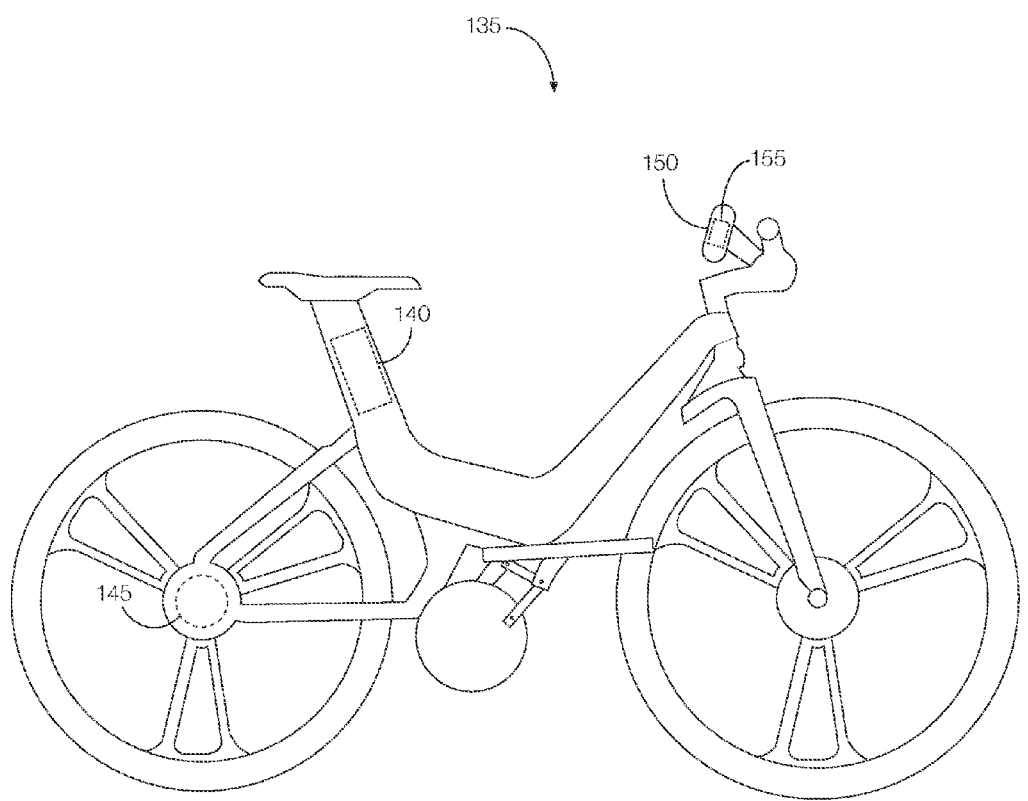
FIG. 3 illustrates an example bicycle that may be used with the vehicle and vehicle system of FIGS. 1 and 2.

As illustrated in FIG. 1, the electric vehicle 100 is powered by an on-board battery 105 and includes a vehicle system 110 (see FIG. 2) that can generate a route to a destination based on the states of charge of the on-board battery 105 as well as batteries of other vehicles, such as an electric bicycle 135 (see FIG. 3). The on-board battery 105 may be configured to provide electrical power to any number of vehicle subsystems or accessories. Moreover or alternatively, the on-board battery 105 may provide electrical power to a motor that can propel the vehicle 100.

Further, instead of charging the electric bicycle 135 via the on-board battery 105, the vehicle system 110 may be configured to direct a gasoline engine or other powertrain component to charge the bicycle 135. Thus, the system 110 may be incorporated into gas-powered vehicles and hybrid vehicles including plug-in hybrid electric vehicles.

Although illustrated as a sedan, the electric vehicle 100 may include any passenger or commercial vehicle such as a car, a truck, a sport utility vehicle, a taxi, a bus, etc. In some possible approaches, the electric vehicle 100 is an autonomous vehicle configured to operate in an autonomous (e.g., driverless) mode, a partially autonomous mode, and/or a non-autonomous mode. The bicycle 135 (see FIG. 3) may be stowed in the vehicle 100 in, e.g., the trunk or other compartment or mounted to a carrier on top of or behind the vehicle 100.

Referring now to FIG. 2, the vehicle system 110 may include a charging interface 115, a processing device 120, and a navigation module 125.

The charging interface 115 may allow the on-board battery 105 to electrically connect to a power source, which may include a gasoline engine, another battery, such as a bicycle battery 140 (see FIGS. 3 and 4), or both. When connected to the power source, the on-board battery 105 may be charged through the charging interface 115. That is, the state of charge of the on-board battery 105 may increase while the power source is plugged into the charging interface 115. Moreover or in the alternative, the charging interface 115 may facilitate the charging of the bicycle battery 140 by the on-board battery 105 or other power source. Thus, by plugging the bicycle battery 140 into the charging interface 115, electrical energy from the on-board battery or other power source 105 may charge the bicycle battery 140. When the system 110 is incorporated into a gas-powered vehicle or a hybrid vehicle, including a plug-in hybrid electric vehicle, the charging interface 115 may be used to connect the bicycle battery 140 to other types of power sources 105 such as a gasoline engine on-board the vehicle 100.

The processing device 120 may be programmed to monitor the batteries plugged into the charging interface 115. Thus, the processing device 120 may determine the states of charge of the on-board battery 105, the bicycle battery 140, or both. Moreover, the processing device 120 may be configured to estimate a traveling range of the batteries. The traveling range may be a function of the state of charge and the type of vehicle (e.g., an automobile or a bicycle). Since bicycles are typically lighter than most automobiles, a bicycle may travel further with a bicycle battery 140 having the same or a lower state of charge relative to an on-board battery 105, for example.

The navigation module 125 may be programmed to determine a position of the vehicle 100. The navigation module 125 may include a Global Positioning System (GPS) receiver configured to triangulate the position of the vehicle 100 relative to satellites or terrestrial based transmitter towers. The navigation system, therefore, may be configured for wireless communication. The navigation system may be further programmed to develop routes from the current location to a selected destination, as well as display a map and present driving directions to the selected destination via, e.g., a user interface device. In generating the route, the navigation module 125 may consider the estimated traveling ranges of both the vehicle 100 and the bicycle 135. For instance, the route may specify using the vehicle 100 to travel from a starting (i.e., current) location to an intermediate location. Because traveling the route to the intermediate location relies upon the vehicle 100, the route may include roads or other infrastructure where vehicle traffic is permitted. The intermediate location may include a parking lot at the outskirts of a crowded urban area or other area where vehicle navigation is difficult. Once the vehicle 100 is parked, the route may specify using the bicycle 135 to travel from the intermediate location to the selected destination. The route from the intermediate location to the selected destination may include infrastructure that is suited for bicycle traffic. Examples of such infrastructure may include bike paths, bicycle lanes, sidewalks (where permitted), etc., in addition to roads.

The navigation module 125 may be further programmed to consider whether the bicycle battery 140 has sufficient charge to return to the vehicle 100 at the intermediate location from the selected destination, and whether the on-board battery 105 has sufficient charge to travel from the intermediate location to the nearest charging station. If not, the navigation module 125 may prompt the user to seek an alternative route or charge the on-board battery 105 or bicycle battery 140 prior to embarking on the route. As discussed above, the on-board battery 105 or the bicycle battery 140 can be charged by a gasoline engine or other power source, in which case the charging station may include a gas station. Moreover, the navigation module 125 may consider whether the bicycle battery 140 can be charged by the on-board battery 105 via, e.g., the charging interface 115, while the vehicle 100 travels from the intermediate location to the nearest charging station. The navigation module 125 may communicate whether the on-board battery 105 can both charge the bicycle battery 140 and reach the charging location to the processing device 120 or the charging interface 115. The processing device 120 or charging interface 115 may facilitate the charging of the bicycle battery 140 accordingly, which may include waiting to charge the bicycle battery 140 until the on-board battery 105 has been at least partially recharged.

The communication module may be programmed to facilitate wired or wireless communication between the components of the vehicle 100 and other devices, such as a remote server or even another vehicle when using, e.g., a vehicle-to-vehicle communication protocol. The communication module may be configured to receive messages from, and transmit messages to, a cellular provider's tower and the Telematics Service Delivery Network (SDN) associated with the vehicle 100 that, in turn, establishes communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication module may also be programmed to communicate directly from the vehicle 100 to the user's remote device or any other device using any number of communication protocols such as Bluetooth®, Bluetooth® Low Energy, or WiFi. An example of a vehicle-to-vehicle communication protocol may include, e.g., the dedicated short range communication (DSRC) protocol.

Accordingly, the communication module may be configured to receive signals that the navigation module 125 may use to, e.g., triangulate the location of the vehicle 100 or bicycle 135. Moreover, the communication module may be programmed to transmit routes generated by the navigation module 125 to, e.g., the bicycle 135 or a mobile device 150 (see FIG. 4). In addition or in the alternative, the communication module may be programmed to transmit the states of charge of the bicycle battery 140 or the on-board battery 105 to the bicycle 135 or the mobile device 150.

FIG. 3 illustrates an example bicycle 135 that may be used with the vehicle 100 and vehicle system 110 of FIGS. 1 and 2. The bicycle 135 may be an electric bicycle with an electric motor 145 powered by a power source such as a bicycle battery 140. The bicycle battery 140 may provide the electric motor 145 with an electric change. In response, the electric motor 145 may rotate. The rotation of the electric motor 145 may drive the wheels, propelling the bicycle 135. The bicycle battery 140 may be configured to connect to the charging interface 115 on-board the vehicle 100. Therefore, the on-board battery 105 may charge the bicycle battery 140. Alternatively or in addition, the bicycle battery 140 may be charged when the vehicle 100 or charging interface 115 is plugged into a power source.

Figure 4:
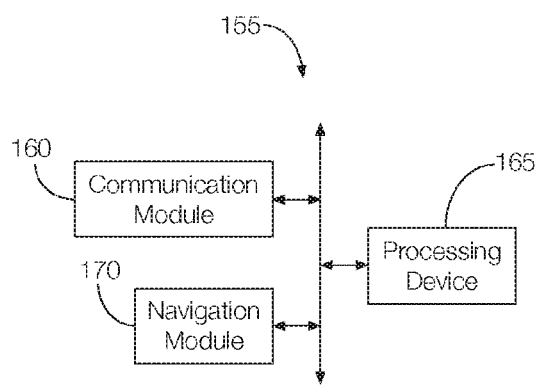
FIG. 4 is a block diagram of an example mobile device that may be incorporated into or used with the bicycle of FIG. 3.

A mobile device 150, implementing a bicycle system 155, may be incorporated into or otherwise used with the bicycle 135. Referring now to FIG. 4, the mobile device 150 may include a communication module 160, a processing device 165, and a navigation module 170 to implement the bicycle system 155. These components may operate similar to corresponding vehicle 100 components, described above with reference to FIG. 2. That is, the communication module 160 of the bicycle 135 may facilitate wired or wireless communication, the processing device 165 may be programmed to estimate traveling ranges of the vehicle 100 or bicycle 135 based on the states of charge of the on-board battery 105 or bicycle battery 140, and the navigation module 170 may be programmed to generate routes to a selected destination that considers the estimated traveling ranges. The routes generated by the navigation module 170 may include a route from a current location to an intermediate location based on the state of charge of the on-board battery 105 and a route from the intermediate location to the selected destination based on the state of charge of the bicycle battery 140. The navigation module 170 may consider the infrastructure available to the vehicle 100 and bicycle 135 when generating the routes. Moreover, the navigation module 170 may consider whether the bicycle battery 140 can be charged by the on-board battery 105 or gasoline engine (if available) via, e.g., the charging interface 115, while the vehicle 100 travels from the intermediate location to the nearest charging station. The navigation module 170 may communicate whether the on-board battery 105 can both charge the bicycle battery 140 and reach the charging location to the processing device 165 or the charging interface 115. The processing device 165 or charging interface 115 may facilitate the charging of the bicycle battery 140 accordingly, which may include waiting to charge the bicycle battery 140 until the on-board battery 105 has been at least partially recharged. Accordingly, the system incorporated into the vehicle 100 described above with reference to FIGS. 1 and 2 can be implemented on a mobile device 150 such as a cell phone, laptop computer, tablet computer, or the like.

Figure 5:
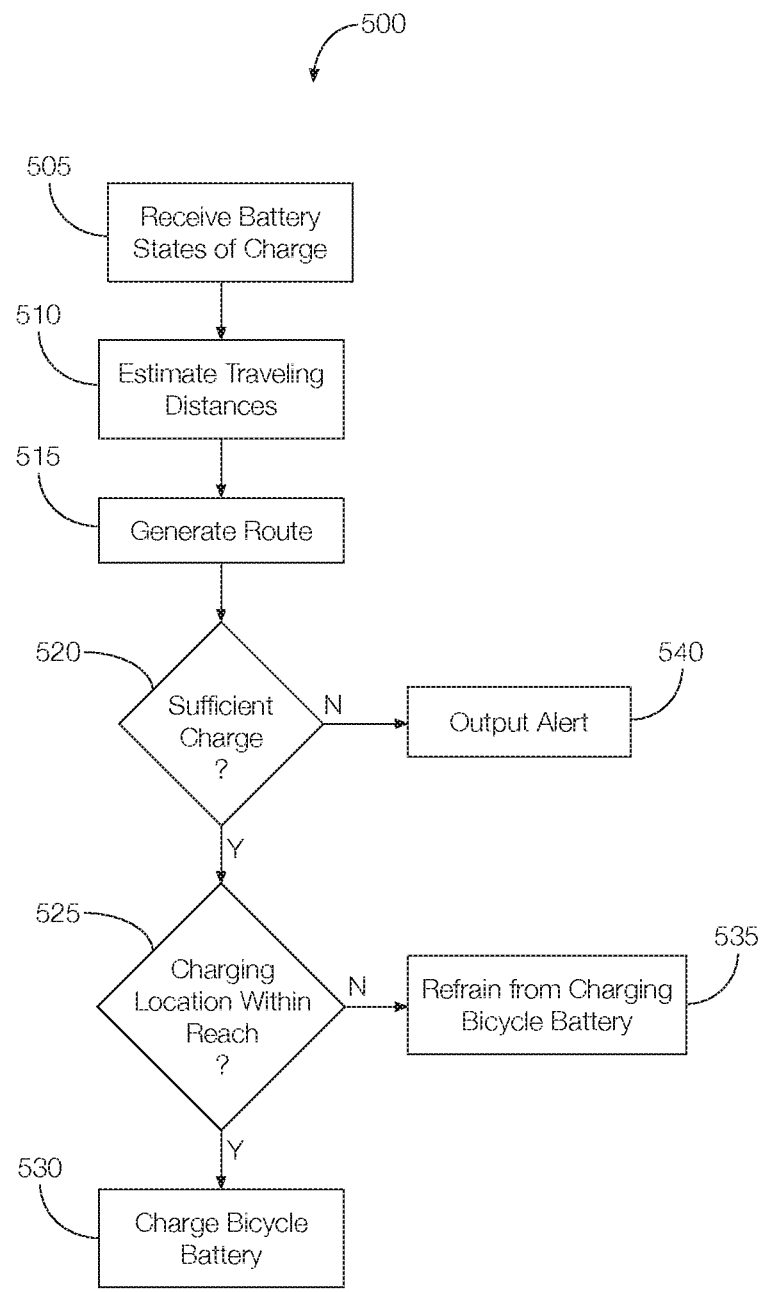
FIG. 5 is a flowchart of an example process that may be executed by the vehicle system or the mobile device.

FIG. 5 is a flowchart of an example process 500 that may be executed by the vehicle system 110 or the bicycle system 155. As discussed above, the bicycle system 155 may be executed by, e.g., a mobile device 150 incorporated into or used with the bicycle 135. The process 500 may be initiated, for example, when the bicycle battery 140 is plugged into the charging interface 115 on-board the vehicle and after the user has selected a destination.

At block 505, the processing device 120, 165 may receive state of charge data associated with the on-board battery 105, the bicycle battery 140, or both. In some instances, the state of charge data is collected by the charging interface 115 located on the vehicle 100 and transmitted to the processing device 120, 165 via, e.g., the communication module 130, 160 through a wired or wireless communication protocol.

At block 510, the processing device 120, 165 may estimate the traveling distances of the vehicle 100 and the bicycle 135. The traveling distance of the vehicle 100 may be estimated from the state of charge of the on-board battery 105 or the amount of fuel in the gas tank. The traveling distance of the bicycle 135 may be estimated from the state of charge of the bicycle battery 140. The traveling distance estimates may be transmitted to the navigation module 125, 170.

At block 515, the navigation module 125, 170 may receive the estimated traveling distances and generate a route to the selected destination. The route may include a route from the current location of the vehicle 100 to an intermediate location. The route to the intermediate location may be based on the state of charge of the on-board battery 105 or the bicycle battery 140 (i.e., whether the bicycle battery 140 has sufficient charge to the destination location and back to the intermediate location), and may rely on infrastructure available to the vehicle 100. The route may further include a route from the intermediate location to the selected destination based on the state of charge of the bicycle battery 140. Moreover, the route to the selected destination may identify infrastructure available for bicycle traffic.

At decision block 520, the navigation module 125, 170 may determine whether the on-board battery 105 has sufficient charge for the vehicle 100 to reach a charging location from the intermediate location. In the context of gas-powered or hybrid vehicles, the navigation module 125, 170 may determine whether the fuel tank has sufficient fuel for the vehicle 100 to reach a gas station. If so, the process 500 may continue at block 525. Otherwise, the process 500 may continue at block 540.

At decision block 525, the navigation module 125, 170 may determine whether the on-board battery 105 or other power source can get the vehicle 100 to the charging location, which in the context of a gas-powered vehicle may include a gas station, while also charging the bicycle battery 140 via the charging interface 115. If so, the process 500 may continue at block 530. If the on-board battery 105 or other power source is unable to reach the charging location and charge the bicycle battery 140, the process 500 may continue at block 535.

At block 530, the navigation module 125, 170 or processing device 120, 165 may output a command to the charging interface 115 to charge the bicycle battery 140 with power output from the on-board battery 105 or gasoline engine. Outputting the command may include outputting a signal or setting a flag. The process 500 may end after block 530.

At block 535, the navigation module 125, 170 or processing device 120, 165 may output a command to the charging interface 115 to refrain from charging the bicycle battery 140 with power output from the on-board battery 105 or gasoline engine. Outputting the command may take the form of transmitting a signal or setting a flag. The process 500 may end after block 530.

At block 540, the navigation module 125, 170 or processing device 120, 165 may output an alert to the user indicating that the selected destination is beyond the reach of the vehicle 100 and bicycle 135. The alert may include an audible alert, a visual alert, or both. The alert may, in some instances, instruct the user to take the vehicle 100 to the closest charging location so that the states of charge of the on-board battery 105 and the bicycle battery 140 may be increased. For gas-powered vehicles, the charging location may include a gas station. In some possible approaches, the alert may prompt the user to indicate whether the gasoline engine should be used to charge the on-board battery 105 (if applicable), the bicycle battery 140, or both. After at least one of the states of charge has been increased, the navigation module 125, 170 or processing device 120, 165 may reevaluate whether the vehicle 100 and bicycle 135 can reach the selected destination at the next key-on cycle or the next time the user selects a destination.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile device comprising:
   a communication module configured to receive state of charge data from a vehicle system, wherein the state of charge data includes a state of charge of a vehicle battery and a bicycle battery;
   a processing device programmed to estimate traveling ranges of a vehicle and a bicycle based on the states of charge; and
   a navigation module programmed to generate a route to a selected destination based on the estimated traveling ranges of the vehicle and the bicycle.

2. The mobile device of claim 1, wherein generating the route to the selected destination includes generating a route from a current location to an intermediate location, and from the intermediate location to the selected destination.

3. The mobile device of claim 2, wherein the route from the current location to the intermediate location is based on the state of charge of the vehicle battery.

4. The mobile device of claim 2, wherein the route from the intermediate location to the selected destination is based on the state of charge of the bicycle battery.

5. The mobile device of claim 2, wherein the navigation module is programmed to generate a route from the selected destination to the intermediate location.

6. The mobile device of claim 5, wherein the route from the selected destination to the intermediate location is based at least in part on the state of charge of the bicycle battery.

7. The mobile device of claim 2, wherein the navigation module is programmed to generate a route from the intermediate location to a charging location.

8. The mobile device of claim 7, wherein the route to the charging location is based at least in part on a state of charge of the vehicle battery.

9. An electric bicycle comprising:
   a battery;
   a communication module configured to receive state of charge data from a vehicle system, wherein the state of charge data includes a state of charge of a vehicle battery and a bicycle battery;
   a processing device programmed to estimate traveling ranges of a vehicle and a bicycle based on the states of charge; and
   a navigation module programmed to generate a route to a selected destination based on the estimated traveling ranges of the vehicle and the bicycle, wherein the route to the selected destination includes a route from a current location to an intermediate location, and from the intermediate location to the selected destination, wherein the route to the intermediate location is based on the state of charge of the vehicle battery and the route from the intermediate location to the selected destination is based on the state of charge of the bicycle battery.

\* \* \* \* \*